United States Patent
Choi et al.

(10) Patent No.: US 6,405,045 B1
(45) Date of Patent: Jun. 11, 2002

(54) DYNAMIC OVERLOAD CONTROL DEVICE AND METHOD IN DIGITAL MOBILE COMMUNICATION SYSTEM

(75) Inventors: Kyong-Sub Choi, Chungchongbuk-do; Joon-Sik Sim; Won-Moo Kim, both of Seoul, all of (KR)

(73) Assignee: Hyundai Electronics Inds. Co. Ltd., Kyoungki-do (KR)

( * ) Notice: Subject to any disclaimer, the term of this patent is extended or adjusted under 35 U.S.C. 154(b) by 0 days.

(21) Appl. No.: 08/975,794

(22) Filed: Nov. 21, 1997

(30) Foreign Application Priority Data

Nov. 30, 1996 (KR) .............................. 96-60247

(51) Int. Cl.[7] .................................. H04Q 7/00
(52) U.S. Cl. .................. 455/453; 455/433; 455/452; 370/230; 370/229
(58) Field of Search ................. 455/452, 453, 455/445, 435, 433; 370/229, 230, 232, 234, 235

(56) References Cited

U.S. PATENT DOCUMENTS

| | | | |
|---|---|---|---|
| 4,631,363 A | * 12/1986 | Foster et al. ................. 379/15 |
| 5,548,533 A | 8/1996 | Gao et al. .................... 364/514 |
| 5,548,804 A | * 8/1996 | Rosenlund .................. 455/33.1 |
| 5,623,532 A | * 4/1997 | Houde et al. ................. 379/58 |
| 5,783,969 A | * 7/1998 | Luz .......................... 330/124 R |
| 5,787,357 A | * 7/1998 | Salin .......................... 455/466 |
| 5,867,787 A | * 2/1999 | Vudali et al. ................ 455/445 |

* cited by examiner

Primary Examiner—Edward F. Urban
Assistant Examiner—Congvan Tran
(74) Attorney, Agent, or Firm—Lackenbach Siegel

(57) ABSTRACT

A dynamic overload control device and method for preventing a stoppage of a system and interruption of communication by dynamically controlling a resource use rate and processor overload in a base transceiver station and base station controller in a digital mobile communication system, the method includes the steps of: storing thresholds obtained at each point used in a data base for determining an overload after initializing, allocating an overload control process according to the thresholds, and starting the overload control process; detecting an overload detect value and determining the overload after comparing the overload detect value with the threshold allocated; and if the overload is determined, selecting one between a call allocation operation and a call allocation rejection operation, and processing the overload.

8 Claims, 3 Drawing Sheets

DYNAMIC OVERLOAD CONTROL DEVICE AND METHOD IN DIGITAL MOBILE COMMUNICATION SYSTEM

BACKGROUND OF THE INVENTION

1. Field of the Invention

The present invention relates to a dynamic overload control in a digital mobile communication system. Specifically, this invention is a dynamic overload control device and method for preventing a stoppage of a system and interruption of communication by dynamically controlling a resource use rate and processor overload in a base transceiver station and base station controller in a digital mobile communication system.

2. Discussion of Related Art

Usually, a mobile communication system using a code division multiple access (CDMA) system is based on a spread spectrum communication. This mobile communication system points to solve the capacity problem of demand for the mobile communication and provide an economical, efficient, and conveniently portable system.

The usual CDMA mobile communication system is largely divided into a mobile switching center (MSC), a base station controller (SC), a base transceiver station (BTS), and a mobile station (MS). FIG. 1 shows a schematic configuration of such the CDMA mobile communication system.

The MSC is modularized to facilitate addition of functions and change in hardware or software, and employs an open structure to facilitate various network connections, and a modification and extension for improvement of performance of the expansion of capacity. The BSC, which is located between the BTS and MSC, can include base station control groups (BSCG) up to twelve. The BSC communicates with the BTS in the form of voice packet through a cable and performs transmission of voice and signals to the MSC, voice compression trans-coding, man-machine interface for operator matching, operation management, and configuration management. The BTS transmits/receives information of the MS to/from the BSC through a cable, and performs call process, management of radio resources, management of visual information transmitted between the MS and itself, sensing of errors, collecting and informing statistic information, packet routing, and power control. The MSC, as shown in FIG. 1, includes a home location register (HLR) for storing and managing data and parameter to provide a proper mobile communication service to a subscriber and for controlling subscriber management such as certification, encoding, and offer of routing information and additional service information.

Such a digital mobile communication system performs overload control by uniformly controlling allocation or rejection of allocation based upon only the performance of process and the communication resource use rate. The CDMA mobile communication system indiscriminately allocates or rejects a call after considering the occupancy of call resource and the stream of signals against a type of call, such as an out-going call, incoming call, or handoff request call. Such a usual digital mobile communication system cannot protect the handoff call, thus causing the interruption of communication.

SUMMARY OF THE INVENTION

Accordingly, the present invention is directed to a dynamic overload control device and method in a digital mobile communication system that substantially obviates one or more of the limitations and disadvantages of the related art.

An object of the present invention is to provide a dynamic overload control device and method for dynamically controlling the resource use rate and processor overload in a base transceiver station (BTS) and base station controller (BSC) in a digital mobile communication system.

Another objective of the present invention is to provide a dynamic overload control device and method for dynamically controlling the resource use rate and processor overload in a BTS and BSC to prevent the stop of a system in a digital mobile communication system.

Still another objective of the present invention is to provide a dynamic overload control device and method for dynamically controlling the resource use rate and processor overload in a BTS and BSC to prevent the interruption of communication in a digital mobile communication system.

Additional features and advantages of the invention will be set forth in the description which follows, and in part will be apparent from the description, or may be learned by practice of the invention. The objects and other advantages of the invention will be realized and attained by the structure as illustrated in the written description and claims hereof, as well as the appended drawings.

To achieve these and other advantages, and in accordance with the purpose of the present invention as embodied and broadly described, a dynamic overload control device in a digital mobile communication system, includes: a data base for storing thresholds obtained at each point used for determining an overload; a drive unit installed in a base control processor (BCP) and a central control processor (CCP), for allocating an overload control process according to the thresholds of each point, used for determining the overload, stored in the data base, and starting the overload control process; an overload detect unit for periodically detecting activity ratios in the BCP and CCP and a call resource occupancy rate in a base transceiver station, and determining the overload after comparing an overload detect value with the thresholds obtained from the drive unit; and an overload process unit for processing the overload after selecting one between a call allocation operation and a call allocation rejection operation, if the overload is detected by the overload detect unit.

In another aspect, the present invention provides a dynamic overload control method in a digital mobile communication system, including the steps of: storing thresholds obtained at each point used for determining an overload in a data base after initialization, allocating an overload control process according to the thresholds, and starting the overload control process; detecting an overload detect value and determining the overload after comparing the overload detect value with the threshold allocated; and if the overload is determined, selecting one between a call allocation operation and a call allocation rejection operation, and processing the overload.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the attached drawings, the preferred embodiment of the present invention is described below in detail.

Figure 1:
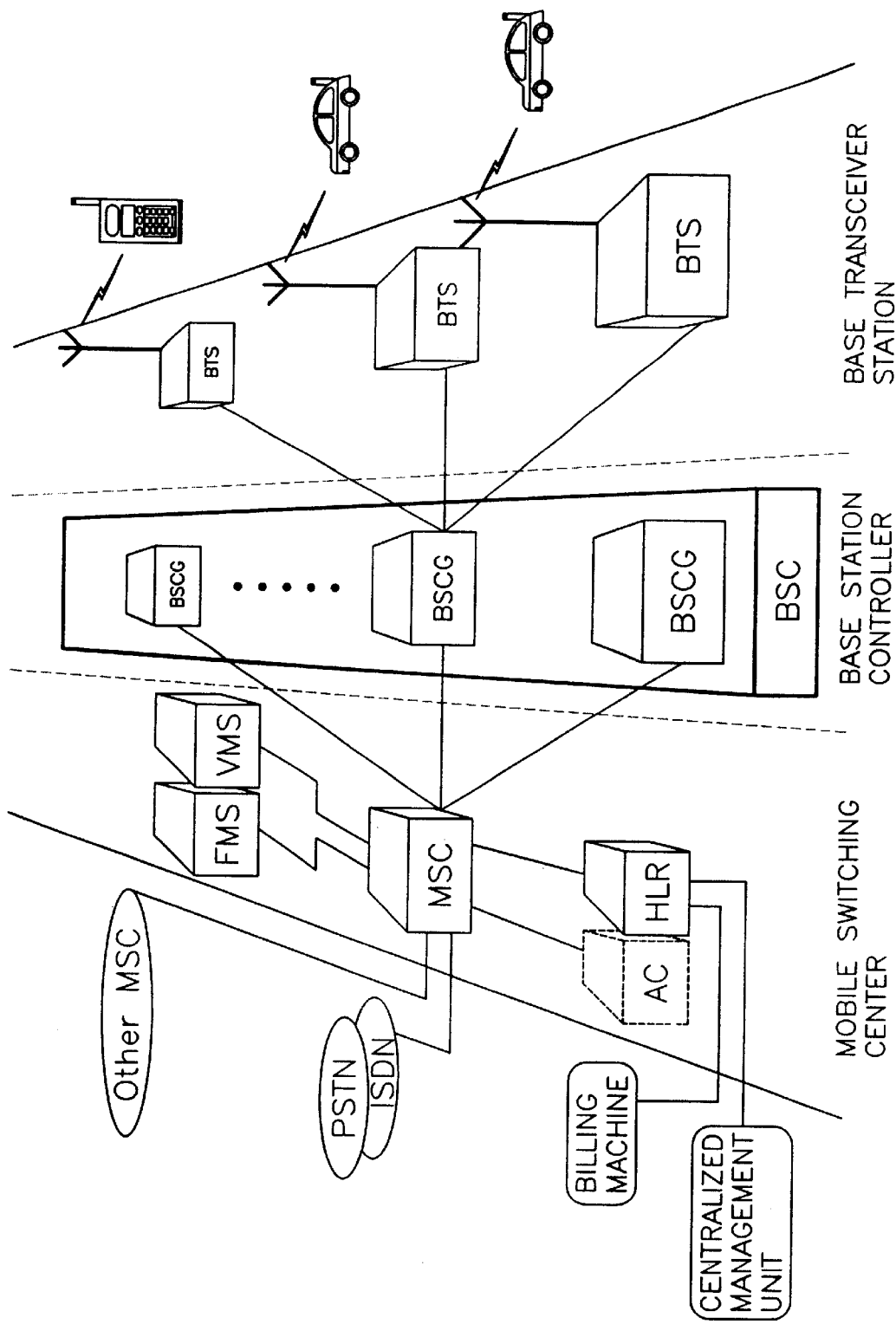
FIG. 1 illustrates a schematic configuration of a usual CDMA mobile communication system.
Figure 2:
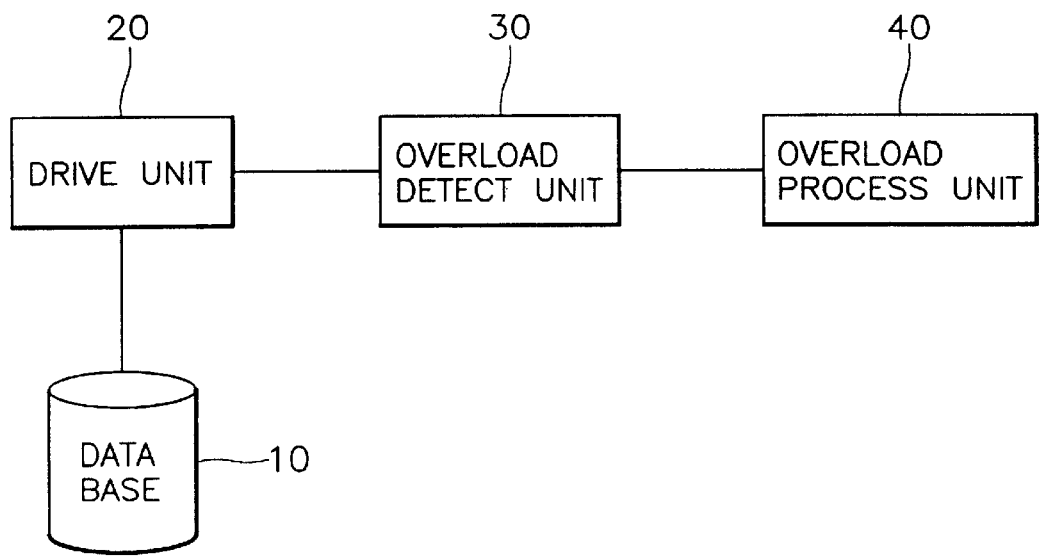
FIG. 2 is a block diagram of a dynamic overload control device in a digital mobile communication system according to the present invention.

FIG. 2 is a block diagram of a dynamic overload control device in a digital mobile communication system according to the present invention. Data base 10 stores overload thresholds obtained at each point used for determining overload. Drive unit 20, which is installed in a base control processor (BCP) and a central control processor (CCP), fetches the thresholds of each point used for determining overload from data base 10 and allocates an overload control process before starting the overload control process. Overload detect unit 30 periodically detects the activity ratios in the BCP and CCP and the call resource occupancy rate in the BTS, and determines an overload after comparing an overload detect value with the thresholds obtained from drive unit 20. If an overload is detected by overload detect unit 30, overload process unit 40 processes the overload after selecting one between a call allocation operation and a call allocation rejection operation.

Figure 3:
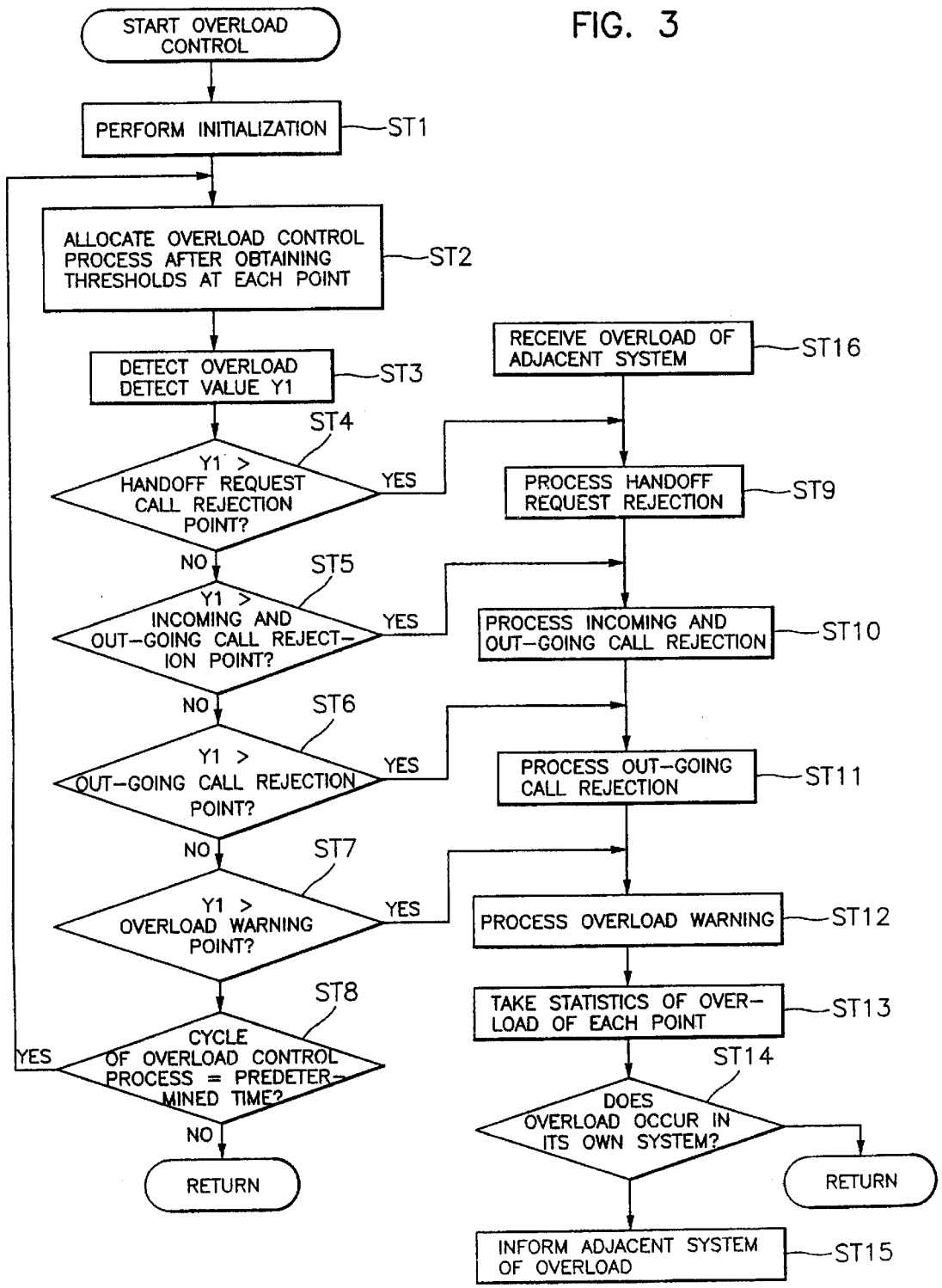
FIG. 3 is a flow chart of a dynamic overload control method in a digital mobile communication system according to the present invention.

FIG. 3 is a flow chart of a dynamic overload control method in a digital mobile communication system according to the present invention. The overload process method includes the steps of: storing thresholds obtained at each point used for determining an overload in data base 10 after initialization, allocating an overload control process according to the thresholds, and starting the overload control process (ST1–ST2); detecting the overload values at each point and determining the overload after comparing the overload defect value with the allocated thresholds (ST3–ST8); and, if the overload is determined, or is received from an adjacent system, selecting one between a call allocation operation and a call allocation rejection operation, and processing the overload (ST9–ST16).

This overload process method is described below in detail.

Drive unit 20, which is installed in the BCP and CCP, performs initialization (ST1), reads the thresholds at each point used for determining an overload from data base 10 when a relevant overload control processor is started, and establishes the thresholds as reference values.

Thresholds at points, such as a handoff request call rejection point, an incoming and out-going call rejection point, an out-going call rejection call, and an overload warning point, used for determining the overload, have already been obtained and stored in data base 10 before starting to control the overload. The overload warning point is a reference value used for determining whether to warn a system operator of the impendence of overload. The out-going call rejection point is a reference value used for determining whether to reject the forwarding of an out-going call. The incoming and out-going call rejection point is a reference value used for determining whether to reject the forwarding of incoming and out-going calls. The handoff request call rejection point is a reference value used for determining whether to reject a handoff request call. The handoff request call rejection point, incoming and out-going call rejection point, out-going call rejection point, and overload warning point are not predetermined, but established variably according to the service capacity of a system presently in operation.

Once drive unit 20 obtains the thresholds at each point and stores them in data base 10, it allocates an overload control process based upon the thresholds at each point and starts the overload control process (ST2).

If the overload control process is started, overload detect unit 30 periodically detects a BCP activity ratio, BTS call resource occupancy rate, CCP activity ratio, and BSC call resource occupancy rate, and selectively compares the detected value with the thresholds from drive unit 20 before determining the overload.

Specifically, overload detect unit 30, which periodically checks an overload and detects a value used for determining the overload (ST3), compares the overload detect value Y1 with the handoff request call rejection point from drive unit 20 in the first place (ST4). If overload detect value Y1 exceeds the handoff request call rejection point, overload detect unit 30 concludes the overload. If overload detect value Y1 is below the handoff request call rejection point, overload detect unit 30 compares overload detect value Y1 with the incoming and outgoing call rejection point (ST5) If overload detect value Y1 exceeds the incoming and out-going call rejection point, overload detect unit 30 concludes the overload. If overload detect value Y1 is below the incoming and out-going call rejection point, overload detect unit 30 compares overload detect value Y1 with the out-going call rejection point (ST6). If overload detect value Y1 exceeds the out-going call rejection point, overload detect unit 30 concludes the overload. If overload detect value Y1 is below the out-going call rejection point, overload detect unit 30 compares overload detect value Y1 with the overload warning point (ST7). If overload detect value Y1 exceeds the overload warning point, overload detect unit 30 concludes the overload. If overload detect value Y1 is below the overload warning point, overload detect unit 30 compares a cycle of an overload control process with the lapse of a predetermined time. If the cycle of an overload control process is equal to the lapse of a predetermined time, the progress returns to the first step. If the cycle of an overload control process is not equal to the lapse of a predetermined time, overload detect unit 30 repeatedly performs the above comparison processes (ST8).

After concluding the overload through the comparison processes, overload detect unit 30 informs overload process unit 40 at which point the overload occurred. Overload process unit 40 performs an overload control process on the overload at the point notified.

Specifically, if overload process unit 40 detects the overload in the handoff request call, it rejects the allocation for all call requests. Since the overload occurs when there is an incoming or out-going call request in this case, the incoming or out-going call is rejected. Since the overload also occurs when there is an out-going call request in this case, the out-going call is rejected. Simultaneously, overload process unit 40 informs an operator and adjacent systems, such as MSC, BSC, and BTS, that the relevant system is near to the overload (ST9–ST12).

If overload process unit 40 detects an incoming and outgoing call overload, since the overload occurs when there is an incoming or out-going call request, incoming or out-going call is rejected. Simultaneously, overload process unit 40 informs an operator and adjacent systems, such as MSC, BSC, and BTS, that the relevant system is near to the overload (ST10–ST12).

If overload process unit 40 detects an out-going call overload, an out-going call is rejected when there is an outgoing call request. Simultaneously, overload process unit 40 informs an operator and adjacent systems, such as MSC, BSC, and BTS, that the relevant system is near to the overload (ST11–ST12).

If overload process unit 40 detects an overload warning point, it informs an operator and adjacent systems, such as MSC, BSC, and BTS, that the relevant system is near to the overload (ST12).

After processing the overloads at each point, overload process unit 40 takes statistics of the overloads at each point (ST13), and checks whether the overload occurs in its own system or not (ST14). If the overload is not from its own system, the progress returns to the first step. If the overload is from its own system, overload process unit 40 informs the adjacent systems of the overload (ST15).

When overload process unit 40 receives the overload information from an adjacent system (ST16), it processes each overloads through the above process operations. If an adjacent system notifies the overload to overload process unit 40, overload process unit 40 does not require the relevant system to allocate a call, but stores the status of a rejected call before notifying the change of a reference point to an operator.

As illustrated above, the present invention determines an overload based upon the analysis of calls by their types and selectively and properly processes the overload, thereby preventing the interruption of communication which can occur in controlling the overload and providing a more stable communication service. Additionally, the present invention controls only a relevant call by allocating a call or rejecting to allocate a call at a relevant point where an overload occurs, thereby solving the problem of the stop of a system caused by the overload.

It will be apparent to those skilled in the art that various modifications and variations can be made in a dynamic overload control device and method of the present invention without deviating from the spirit or scope of the invention. Thus, it is intended that the present invention cover the modifications and variations of this invention provided they come within the scope of the appended claims and their equivalents.

What is claimed is:

1. A dynamic overload control device in a digital mobile communication system, comprising:
    a data base for storing thresholds obtained at each point used for determining an overload;
    drive means installed in a base control processor (BCP) and a central control processor (CCP), for allocating an overload control process according to the thresholds of each point, used for determining the overload, stored in the data base, and starting the overload control process;
    overload detect means for periodically detecting activity ratios in the BCP and CCP and a call resource occupancy rate in a base trasceiver station, and determining the overload after comparing an overload detect value with the thresholds obtained from the drive means;
    overload process means for processing the overload after selecting one between a call allocation operation and a call allocation rejection operation, if the overload is detected by the overload detect means;

wherein the drive means obtains the thresholds at each point and stores them in the data base right after initializing a system, and
    the overload detect means compares the overload detect value with the thresholds at each point respectively and concludes the overload when the overload detect value exceeds each threshold.

2. A dynamic overload control method in a digital mobile communication system, comprising the steps of:
    storing thresholds obtained at each point used in a data base for determining an overload after initialization,
    allocating an overload control process according to the thresholds, and starting the overload control process;
    detecting an overload detect value and determining the overload after comparing the overload detect value with the threshold allocated; and
    if the overload is determined, selecting on between a call allocation operation and a call allocation rejection operation, and processing the overload;
    wherein the determination of the overload comprises the steps of detecting the overload detect value, comparing the overload detect value with a handoff request call rejection point, comparing the overload detect value with an incoming and out-going call rejection point, comparing the overload detect value with an out-going call rejection point, comparing the overload detect value with an overload warning point, and comparing a cycle of an overload control process with lapse of a predetermined time.

3. The method according to claim 2, wherein, in the step of processing the overload, if an handoff request call overload is detected, allocation for all call requests is rejected, since the overload occurs when there is an incoming or out-going call request in this case, incoming or out-going call is rejected, since the overload also occurs when there is an out-going call request in this case, an out-going call is rejected, and, simultaneously, that the relevant system is near to the overload is notified to an operator and adjacent system.

4. The method according to claim 2, wherein, in the step of processing the overload, if an incoming and out-going call overload is detected, since an overload occurs when there is an incoming or out-going call request in this case, incoming or out-going call is rejected, and, simultaneously, that the relevant system is near to the overload is notified to an operator and adjacent system.

5. The method according to claim 2, wherein, in the step of processing the overload, if an out-going call overload is detected, an out-going call is rejected, and, simultaneously, that the relevant system is near to the overload is notified to an operator and adjacent system.

6. The method according to claim 2, wherein, in the step of processing the overload, if an overload warning point is detected, that the relevant system is near to the overload is notified to an operator and adjacent system.

7. The method according to claim 2, wherein, in the step of processing the overload, the overloads at each point are taken statistics of, and, if the overload occurs in its own system, the overload is notified to an adjacent system.

8. The method according to claim 2, wherein, in the step of processing the overload, if the overload is received from an adjacent system, allocation for all call requests is rejected, an incoming or out-going call is rejected when there is an incoming or out-going call request, an out-going call is rejected when there is an out-going call request, and that a relevant system is near to the overload is notified to an operator and adjacent system.

* * * * *